United States Patent
Klinger et al.

(10) Patent No.: US 10,286,797 B2
(45) Date of Patent: May 14, 2019

(54) DRIVE ARRANGEMENT FOR AN ELECTRIC DRIVE WITH AN INDUCTIVELY ENERGIZABLE DRIVE MOTOR, WHEEL CARRIER ARRANGEMENT, AND MOTOR VEHICLE

(71) Applicant: AUDI AG, Ingolstadt (DE)

(72) Inventors: Thomas Klinger, Ingolstadt (DE); Wolfgang Brandstaetter, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/136,604

(22) Filed: Sep. 20, 2018

(65) Prior Publication Data

US 2019/0084430 A1 Mar. 21, 2019

(30) Foreign Application Priority Data

Sep. 20, 2017 (DE) .......................... 10 2017 216 687

(51) Int. Cl.
  *B60L 11/18* (2006.01)
  *H04B 5/00* (2006.01)
(52) U.S. Cl.
  CPC .......... *B60L 11/182* (2013.01); *H04B 5/0087* (2013.01); *B60L 2220/44* (2013.01)
(58) Field of Classification Search
  CPC .............. B60M 3/00; B60M 1/08; B60L 9/00
  See application file for complete search history.

(56) References Cited

U.S. PATENT DOCUMENTS

| 4,014,418 | A | * | 3/1977 | Ikeda | ........................ | B60L 5/38 |
| | | | | | | 191/45 R |
| 4,139,071 | A | * | 2/1979 | Tackett | .................... | B60K 1/00 |
| | | | | | | 180/165 |
| 4,476,947 | A | * | 10/1984 | Rynbrandt | ................ | B60L 9/00 |
| | | | | | | 180/2.1 |
| 5,277,285 | A | * | 1/1994 | Musachio | ................ | B60L 9/00 |
| | | | | | | 180/2.1 |

(Continued)

FOREIGN PATENT DOCUMENTS

| CN | 106143185 A | 11/2016 |
| DE | 23 51 185 B2 | 1/1976 |

(Continued)

OTHER PUBLICATIONS

Examination Report dated Sep. 3, 2018 of corresponding German application No. 10 2017 216 687.8; 8 pgs.

*Primary Examiner* — James A Shriver, II
*Assistant Examiner* — James J Triggs
(74) *Attorney, Agent, or Firm* — Maier & Maier, PLLC

(57) ABSTRACT

A drive arrangement with an inductively energizable drive motor, having a wheel, a wheel carrier, at least one receiver coil that is arranged in the circumferential direction of the wheel, a stator, and a rotor arranged in a rotationally resistant manner on the wheel having at least one rotor winding that is electrically connected to the at least one receiver coil. The rotor can be magnetically coupled to the stator. In this case, the drive arrangement is configured such that a current can be induced by an underground base providing a magnetic field in the at least one receiver coil, by which the at least one rotor winding is energized to generate a magnetic field.

16 Claims, 3 Drawing Sheets

(56) References Cited

U.S. PATENT DOCUMENTS

| | | | | |
|---|---|---|---|---|
| 5,464,082 | A | * | 11/1995 | Young .................... B60L 5/18 |
| | | | | 191/2 |
| 6,471,020 | B1 | * | 10/2002 | Hernandez .......... B60L 11/1816 |
| | | | | 191/2 |
| 8,833,533 | B2 | * | 9/2014 | Suh ...................... B60L 11/007 |
| | | | | 104/281 |
| 9,868,365 | B2 | * | 1/2018 | Hourtane ................ B60M 1/36 |
| 2011/0017531 | A1 | * | 1/2011 | Re Fiorentin ............ B60L 5/42 |
| | | | | 180/65.1 |
| 2011/0031047 | A1 | | 2/2011 | Tarr |
| 2013/0037367 | A1 | * | 2/2013 | Aguilar ................... B60L 5/36 |
| | | | | 191/22 C |
| 2015/0343921 | A1 | * | 12/2015 | Siciliano ............... B60M 1/106 |
| | | | | 191/10 |
| 2018/0037136 | A1 | * | 2/2018 | Nelson ................... B60L 5/005 |
| 2018/0322781 | A1 | * | 11/2018 | Ohman ............ G08G 1/096716 |

FOREIGN PATENT DOCUMENTS

| | | |
|---|---|---|
| DE | 41 15 568 A1 | 2/1993 |
| DE | 198 24 290 A1 | 12/1999 |
| DE | 101 20 742 A1 | 10/2002 |
| DE | 10 2010 011 768 A1 | 12/2011 |
| DE | 20 2015 004 176 U1 | 8/2015 |
| EP | 2 344 357 B1 | 7/2011 |

* cited by examiner

DRIVE ARRANGEMENT FOR AN ELECTRIC DRIVE WITH AN INDUCTIVELY ENERGIZABLE DRIVE MOTOR, WHEEL CARRIER ARRANGEMENT, AND MOTOR VEHICLE

FIELD

The invention relates to a drive arrangement with a drive motor that can be supplied with energy inductively. The invention also relates to a wheel carrier arrangement, as well as a motor vehicle with a drive arrangement.

BACKGROUND

Inductive energy transmission in connection with motor vehicles is known in the prior art. Inductive energy transmission in this case is usually employed to charge a battery of an electric vehicle. Such an inductive energy transmission may also take place while driving, as is known, for example, from transport systems in the field of logistics. In order to allow an inductive energy transmission while driving, coils energized with alternating current are furthermore normally employed in the roadway, which may have different positions depending on the receiver system, such as, for example, in the middle of the driving lane or at the height of tire tracks, and different strength or magnetic field height.

In such systems in which a traction battery is charged while driving, energy is also withdrawn at the same time from the traction battery in parallel, in order to accelerate the vehicle by means of the drive motors. These energy transfers are associated with large energy losses. Furthermore, the inductive energy transmission while driving has additional drawbacks, for example, as compared to charging while parked: if the energy transmission goes to the suspended mass of the motor vehicle, i.e., to the bodywork, for example to receiver coils arranged on the bottom of the vehicle, a relatively large spacing is required between the ground or the transmitter coils located in the underground base driven upon and the receiver coils situated on the underside of the vehicle, in order to ensure the necessary ground clearance. Accordingly, the transmitter coils must be designed such that magnetic fields are generated that are still sufficiently dense, even at relatively great height above the roadway. Besides a definitely reduced efficiency, this also has the drawback of increased magnetic density. Accordingly, so as not to overly burden the surroundings, for example, pedestrians, etc., the transmitter coils must be energized only in the immediate region of the vehicle, and hence a synchronization with the vehicle position is necessary. In addition to the expense that such a synchronizing entails, the transmitter coils must also be designed correspondingly short for this purpose, i.e., viewed in the direction of travel or the course direction of the roadway, which in turn means a very costly laying of lines and energizing.

While a smaller spacing relative to the roadway can be achieved for an energy transmission to the non-rotating, unsuspended mass of the vehicle, such as, for example, the wheel carrier, nevertheless, it is difficult to arrange the coils next to the tires, given the available structural space.

For an energy transmission to the unsuspended, rotating mass of the vehicle, such as the tires, as is also described in DE 198 24290 A1, a transmission of the received energy must take place from the rotating tire to the wheel carrier, according to the prior art. However, this is associated with a corresponding expense, since it must take place, for example, by sliding contacts or repeated inductive energy transmission, which in turn lessens the efficiency.

SUMMARY

The object of the present invention is therefore to indicate an option for how an inductive energy supply for a motor vehicle can be designed more efficiently.

This object is achieved by a drive arrangement, a wheel carrier arrangement, and a motor vehicle.

A drive arrangement according to the invention with a drive motor that can be supplied with energy inductively comprises a wheel for a motor vehicle as well as a wheel carrier, on which the wheel is rotatably mountable. Furthermore, the drive arrangement comprises at least one receiver coil, which is arranged, for example, on or in the wheel, in the circumferential direction of the wheel, and a stator of the drive motor, as well as a rotor of the drive motor, arranged in a rotationally resistant manner on the wheel, having at least one rotor winding, which is electrically connected to the at least one receiver coil, and wherein the rotor can be magnetically coupled to the stator of the drive motor. Furthermore, the drive arrangement is configured such that a current can be induced by an underground base providing a magnetic field into the at least one receiver coil, by means of which the at least one rotor winding is energized to generate a magnetic field, so that the rotor and the stator are magnetically coupled.

Hence, a drive arrangement with a drive motor and at least one receiver coil belonging to it is advantageously provided for the inductive energy transmission, making it possible to accelerate the vehicle regardless of the charge state of the traction battery and without influencing it directly, as soon as the wheel moves over an energized transmitter coil, or in general over an underground base providing the magnetic field. Thus, the current induced in the at least one receiver coil, for example, when the wheel rolls along the underground base, can advantageously be utilized directly for the acceleration of this wheel by sending this induced current directly to the drive motor, that is, by energizing its rotor windings, thereby advantageously creating a torque between the wheel and the wheel carrier, by which the vehicle can be accelerated. Alternatively or additionally, the magnetic coupling provided by the induced current between rotor and stator may also be utilized solely for inductive energy transmission, especially even when the motor vehicle is standing still, for example, in order to charge the traction battery. In this way, many benefits may be achieved with the drive arrangement according to the invention. On the one hand, only a small energy transformation as needed is required, and furthermore, this does not require any classical power electronics or a battery, in particular. Hence, the efficiency can be significantly improved and, moreover, costly elements and components are unnecessary. In addition, an extremely short inductive transmission path can be provided in this way between the roadway, i.e., the underground base providing the magnetic field, and the wheel. This, in turn, also increases the efficiency and lowers the necessary strength of the magnetic field provided by the underground base. This reduced strength of the magnetic field is better for health and may also make possible longer transmitter coils in the roadway and less expense for synchronizing them with the vehicles driving on it. This, in turn, allows for a much more economical use of inductive energy transmission, since the transmitter coils in the roadway can be designed much more economically, as longer coil sections are possible. Few if any interfaces with the rest of the vehicle are also required. Moreover, this solution is very flexible and adaptable by replacing a traditional wheel carrier and a wheel with the wheel carrier and wheel according to the invention, i.e., a wheel carrier with stator and the wheel with the at least one receiver coil and the rotor. A very robust synchronization is also made possible by the direct assignment of wheel position and rotor position of the drive motor.

Thus, on the whole, the drive arrangement according to the invention makes possible an especially efficient inductive energy transmission to the vehicle.

The invention is advantageously suited to motor vehicles of any kind, such as passenger cars, trucks, motorcycles, electric mopeds, pedelecs, and so forth. In this case, the wheel preferably has a rim as well as a tire supported on the rim. The at least one receiver coil is preferably situated on the rim outer diameter, as this allows an especially simple design. Alternatively, the at least one receiver coil may also be vulcanized in the tire, for example, and the rotor may likewise be arranged on the rim of the wheel. In general, the at least one receiver coil may be arranged on a carrier material in a tire of the wheel or be vulcanized directly in the tire of the wheel, that is, embedded in the tire material, or also arranged outside the tire of the wheel.

Furthermore, it is advantageous to arrange a ferrite bridge between the at least one receiver coil and the rim of the wheel, by which the at least one receiver coil and the rim are coupled together. With such a ferrite bridge, a better magnetic coupling can be achieved.

In one advantageous embodiment of the invention, the drive arrangement is designed such that, when the wheel rolls along an underground base providing a magnetic field, a current is induced in the at least one receiver coil, by means of which the at least one rotor winding is energized to generate a magnetic field, so that the rotor and the stator are magnetically coupled, so that the wheel experiences an accelerating force due to the magnetic coupling between the rotor and stator in the current direction of rotation of the wheel as it rolls along. Thus, the energy inductively transmitted to the receiver coil may advantageously be used directly for accelerating the wheel.

In another advantageous embodiment, the stator of the drive motor is arranged in a rotationally resistant manner on the wheel carrier. A wheel hub motor is advantageously provided thereby. In terms of design, this represents an especially simple option for the arrangement of the stator. Alternatively, the stator may also be arranged on the bodywork of the motor vehicle, and may be coupled to the wheel, for example, by a cardan shaft.

In one advantageous embodiment of the invention, the at least one receiver coil is arranged in the circumferential direction on the wheel in such a way that, when the wheel rolls along an underground base providing a magnetic field, especially an underground base providing a magnetic field varying in its strength over time, such as sinusoidally, a current is induced in the at least one receiver coil, whose amplitude has a sinusoidal envelope in its time course. A sinusoidal current curve is especially advantageous, at least in regard to the envelope of this current curve, since in this way it is possible, for example, to provide a phase current and a classical energizing of an electric motor. In particular, the at least one receiver coil is arranged in the circumferential direction on the wheel so that the current induced in it varies between two sinusoidal envelopes displaced by a half period with respect to each other. Alternatively, the receiver coils may also be laid such that the induced current varies between two envelopes having no sine form, but instead an alternative non-constant or amplitude-constant form. In other words, the at least one receiver coil may be arranged in the circumferential direction on the wheel in such a way that, when the wheel rolls along an underground base providing a magnetic field, a current is induced in the at least one receiver coil whose amplitude or whose envelope has a time course differing from a sine shape, especially one that is constant.

Different kinds of windings of the at least one receiver coil are conceivable. In particular, the number of coil windings and their positions may vary, and thus can be designed for the particular application.

For example, it is advantageous according to one exemplary embodiment of the invention when the at least one receiver coil has multiple windings, with the winding intensity varying sinusoidally along the circumference. By the winding intensity is meant here the winding density, that is, the number of winding turns per unit of length in the wheel circumferential direction. In this way, a sinusoidal shape for at least the envelope of the induced current can be advantageously achieved as the wheel rolls along. It would also be conceivable to have a winding which extends sinusoidally along the wheel circumference. A receiver coil may encircle the wheel multiple times, so that an increased turn count is possible. Furthermore, there are many other possibilities for arranging the windings in the circumferential direction to accomplish a sinusoidal course of the envelope of the induced current. A reversal of the winding direction of the at least one receiver coil is also optional. Thus, many possibilities are advantageously available for the configuration of the windings of the at least one receiver coil.

In another advantageous embodiment of the invention, the drive arrangement has multiple receiver coils with respective windings arranged set off from each other in the circumferential direction of the wheel, wherein the windings of the respective receiver coils are set off from one another in the wheel circumferential direction, so that when the wheel rolls along an underground base providing a magnetic field, a current is induced in the respective receiver coils, whose amplitude has a sinusoidal envelope in its time course, so that the respective envelopes are shifted by a particular phase from one another, for example by 120°. This embodiment of the invention now advantageously enables the providing of an induced current that can be converted into a phase current, corresponding to a classical energizing of an electric motor. For this, three phase lines corresponding to three receiver coils may advantageously be sent to the drive motor, i.e., to its rotor. These multiple receiver coils, in particular, may be designed as already described for the at least one receiver coil. For example, if these three receiver coils are identical in configuration and are arranged set off from each other in the wheel circumferential direction by 120° in regard to the wheel circumference, this also produces a current with respective sinusoidal envelopes that are likewise set off from each other by a phase of 120°. The energizing of the drive motor with a phase current or three-phase alternating current can advantageously reduce the material expense for electrical wiring as compared to a single one-phase alternating current system, for the same level of electric power. Furthermore, a star circuit can also be advantageously achieved in this way.

Therefore, another advantageous embodiment of the invention is when the rotor comprises at least three rotor windings and the drive arrangement has three receiver coils, which are arranged in a star circuit, so that first terminals of the respective receiver coils are electrically connected together at a first star point, and respective second terminals of the receiver coils are connected at least indirectly to respective second terminals of the at least three rotor windings, and respective first terminals of the at least three rotor windings are electrically connected together at a second star point. Preferably, the drive motor comprises a whole-number multiple of three rotor windings. In this way, the same number of rotor windings can be supplied with the same respective current phase. Alternatively, a different number of receiver and/or rotor windings may be present.

In an especially preferred embodiment of the invention, the drive arrangement comprises a circuit by which the at least one receiver coil is connected to the at least one rotor winding, wherein the circuit is designed to alter at least one characteristic of the current induced in the at least one receiver coil. In particular, the circuit may comprise a switching device, by means of which the amplitude of the current induced in the at least one receiver coil is scalable and/or temporarily interruptible, and/or the circuit may also be designed to measure and transmit at least one wheel parameter, especially a tire pressure and/or a tire temperature, or other parameters, for example to a device on the motor vehicle side. Such a circuit may be used advantageously in order to change the alternating electric current received by induction from the receiver coils in a predetermined and desirable manner. For example, the circuit may be used for rectifying and/or smoothing and/or scaling of the current curve and/or optionally also for the transmitting of signals. The circuit may be an electrical or electronic circuit. For example, it may be designed as a converter, especially a power converter, or the like. Depending on the application, this circuit may be adapted accordingly in its configurations. For example, it may range from a perfectly simple rectifier bridge to an intelligent logic circuit, optionally with controller. In particular, the circuit is also adapted to the kind of winding of the at least one receiver coil, so that a current induced in the at least one receiver coil upon the rolling of the wheel along the underground base providing the magnetic field varying over time is shaped by the circuit into a sinusoidally varying alternating current. The induced power, i.e., current and/or voltage, may thus be altered, processed, and also measured and supplied to the drive motor in the most diverse of ways. Furthermore, it is also possible to implement a wireless interface, for example, in order to exchange data or control signals bidirectionally with the rest of the vehicle, for example to control the speed or torque, to transmit status data or the wheel parameters from the wheel to the vehicle, and the like. Optionally, a corresponding mechanical contacting can also be utilized in order to provide a wired communication in place of a wireless communication. For example, values measured by the circuit, such as the induced power, can also be used to determine whether the wheel is located in an ideal magnetic field range of the magnetic field provided by the underground base, as shall be explained below.

According to another advantageous embodiment of the invention, the drive motor is designed as a synchronous motor, wherein the stator comprises at least one magnet, especially at least one electromagnet, for providing a magnetic field for the magnetic coupling with the rotor. Alternatively, the drive motor may also be designed as an induction motor, and then the stator is designed as a squirrel cage for the magnetic coupling with the rotor.

Since the energizing comes from the rotating system, that is, the wheel, unlike the usual circuit connection, in this case the rotor is energized and the stator fixed to the wheel carrier is not, at least in the case when this is designed as a squirrel cage. An electrical insulating of the stator from the rest of the wheel carrier may also be provided. This applies especially to the design of the drive motor as an induction motor. If, on the other hand, the drive motor is designed as a synchronous motor, the stator will have magnetic poles. These may be provided by permanent magnets of the stator. If eddy current losses and thus a braking effect occur in the event of a loss of inductive energy transmission, it may be especially advantageous to use one or more electromagnets, especially stator coils, to provide the magnetic poles. These can be energized with direct current, because only a static magnetic field is needed, but an energizing with alternating current for the rotational speed and/or torque regulation is likewise possible. Besides the switching off of the electromagnet when the inductive energy transmission is lost, a control of the driving torque may also be conducted advantageously during operation, i.e., during the inductive energy transmission, by a changing of the current strength through the stator coils. If the stator coils are variably energized, a more or less strong magnetic field can also be provided accordingly, thereby controlling the magnetic coupling to the rotor and the torque transmitted to it. Thus, an acceleration of the wheel in dependence on an energizing of the electromagnet can be controlled advantageously. Another major benefit of this outside excitation is furthermore the elimination of the sometimes costly magnets, such as those based on rare-earth elements.

If the drive motor is based on the principle of a synchronous motor, the current induced in the receiver coils can be transmitted by means of various circuit connections to the rotor coils of the drive motor. For example, three receiver coils could be interconnected with n times 3 rotor coils, where n is a whole number. The corresponding stator pole count can be chosen as desired; for example, drive motors with different pole counts on the stator and rotor side can be realized in this way.

For drive motors based on an asynchronous or induction motor, on the other hand, it is preferable to energize the rotor windings with a higher frequency than that of the wheel rotational speed. This elevated frequency may in turn be defined by the designing of the circuitry between the at least one receiver coil and the rotor coils or rotor windings with the above-described circuit for changing at least one characteristic of the current induced in the at least one receiver coil, but especially by designing the receiver coils so that the induced current has a higher frequency envelope.

Furthermore, it may be provided that a transmission is arranged or switched in between the drive motor, especially the rotor, and the wheel. In this case, the rotor of the drive motor rotates faster than the wheel, and therefore a direct interconnection of the rotor windings with the circuit for changing a characteristic of the induced current is no longer possible, but instead an electrical interface is required, making possible an electrical connection despite the difference in rotational speed. Such an interface may be provided, for example, by sliding contacts, or the like.

Furthermore, the invention relates to a wheel carrier arrangement having a wheel carrier, wherein the wheel carrier arrangement further comprises a stator for a drive motor, and wherein, upon coupling the wheel carrier arrangement with a rotor arrangement having a wheel, which can be rotatably mounted on the wheel carrier, at least one receiver coil, which is arranged in the circumferential direction of the wheel, and a rotor arranged in a rotationally resistant manner on the wheel having at least one rotor winding, which is electrically connected to the at least one receiver coil, the wheel carrier arrangement is designed to exert an accelerating force on the wheel by a magnetic coupling of the stator and the rotor if, when the wheel rolls along an underground base providing a magnetic field, a current is induced in the at least one receiver coil, by means of which the at least one rotor winding is energized to generate the magnetic coupling with the stator.

The wheel carrier arrangement of the invention also has the major benefit that it is designed for the direct acceleration of the wheel, instead of only relaying the energy inductively transmitted to the wheel to an accumulator, such as a traction battery. Even so, the wheel carrier arrangement may likewise be used for the charging of a traction battery and thus not only during driving, but also when standing still.

Furthermore, the features, combinations of features, and their benefits as mentioned in regard to the drive arrangement according to the invention and its embodiments apply equally to the wheel carrier arrangement according to the invention.

Furthermore, the invention also relates to a motor vehicle with a drive arrangement according to the invention or one of its embodiments, and also a motor vehicle with a wheel carrier arrangement according to the invention or one of its embodiments.

In this case, the motor vehicle may furthermore comprise at least one drive mechanism different from the drive motor, such as a drive motor that is designed to accelerate the motor vehicle regardless of whether a magnetic field is provided by an underground base being driven over. Such an additional drive unit or drive motor may also be used optionally as a generator, especially while the vehicle is being accelerated via the drive motor. In this case, for example, during driving, the traction battery can be charged by the drive motor operating as a generator. Such a drive mechanism may be connected, for example, by means of a cardan shaft, to the wheel of the same or to another axle of the vehicle and may also advantageously accelerate the motor vehicle, if an inductive energy supply is not possible.

In another advantageous embodiment of the invention, the motor vehicle is designed to determine, when driving over an underground base that provides a magnetic field in a particular driving range, whether the wheel is located in the particular driving range as a function of the current power available from the drive motor.

For example, the vehicle acceleration, especially in relation to the driving resistances, may be used to infer the power transmitted by induction. This may advantageously serve as information as to whether the tire or tires of the wheels are still located entirely above the transmitter coils in the roadway. This information may then be used advantageously, for example, to automatically correct the trajectory traveled by the vehicle so that it is situated on the defined driving range, if it has been found in the process of the above determination that this is not the case. The vehicle may also be held or guided automatically on the defined driving range in the form of a feedback control. In this way, it may be advantageously realized that the path of the vehicle conforms to an optimal driving lane for achieving a maximum effective inductive energy transmission. In the event of a manual driving operation, the driver may also be presented with information as to a deviation of his current driving lane from the nominal driving lane dictated by the defined driving range, and he can then utilize this information advantageously to correct the driving lane.

Furthermore, a drive arrangement according to the invention may be provided for one or more wheels of the motor vehicle. Advantageously, the motor vehicle has a symmetrical arrangement of drive arrangements in regard to its longitudinal axis. In particular, it is thus preferable to provide at least two drive arrangements, for example, symmetrically on the front axle of the motor vehicle or on the rear axle of the motor vehicle, or also four drive arrangements, two of them on the front axle and two on the rear axle. This applies especially to the configuration of the motor vehicle as a two-axle motor vehicle with four wheels. In the case of motor vehicles with more than two wheel axles, such as trucks with trailers or the like, this also applies analogously to the additional axles. In the case of two-wheeled motor vehicles, such as electric mopeds, motorcycles, or the like, the front or rear axle as well as both wheels may be outfitted with a drive arrangement.

The invention may furthermore be used for other vehicles having one or more wheels. These vehicles can, but need not have, an additional drive unit.

Moreover, the described drive arrangement may also be used to charge the vehicle while parked by means of inductive energy transmission.

BRIEF DESCRIPTION OF THE DRAWINGS

In the following, exemplary embodiments of the invention are described. Shown herein are.

DETAILED DESCRIPTION

The exemplary embodiments discussed below involve preferred embodiments of the invention. In the exemplary embodiments, the components of the embodiments described constitute individual features of the invention, to be considered independently of one another, which modify the invention also independently of each other each time, and thus should also be considered as part of the invention in themselves or in a different combination than the one shown. Furthermore, the described embodiments may also be completed by further features of the invention already described.

In the figures, functionally identical elements are given the same reference numbers each time.

Figure 1:
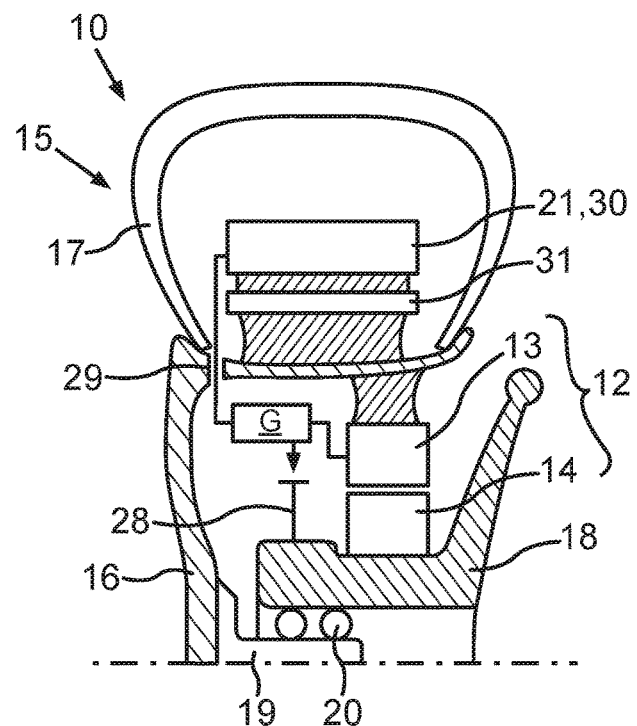
FIG. 1 a schematic cross-sectional representation of a drive arrangement according to one exemplary embodiment of the invention.

FIG. 1 shows a schematic representation of a drive arrangement configured, for example, as a wheel hub motor arrangement 10 in a cross section according to one exemplary embodiment of the invention. The wheel hub motor arrangement 10 here comprises a drive motor, configured as a wheel hub motor 12, which in turn comprises a rotor 13 as well as a stator 14. Furthermore, the wheel hub motor arrangement 10 comprises a wheel 15, having a rim 16 as well as a tire 17 arranged on the rim. Furthermore, the wheel hub motor arrangement 10 also comprises a wheel carrier 18, on which the wheel 15 is rotatably mounted. For this purpose, a wheel bearing 20 can be provided between a wheel hub 19 arranged on the rim 16 and the wheel carrier 18. Moreover, the rotor 13 of the wheel hub motor 12 is arranged in a rotationally resistant manner on the wheel 15, especially on the rim 16. The stator 14 of the wheel hub motor 12 is arranged in a rotationally resistant manner on the wheel carrier 18. Furthermore, the wheel hub motor arrangement 10 comprises at least one receiver coil 21, which is arranged on the wheel in the circumferential direction R (see FIG. 2 and FIG. 3). In particular, the at least one receiver coil 21 with a corresponding carrier material 30, on which the at least one receiver coil 21 is arranged, can be arranged on the rim 16 of the wheel 15, in particular on the rim outer diameter, i.e., on the side of the rim 16 facing away from the wheel carrier 18. Alternatively, the at least one receiver coil 21 may also be vulcanized in the rim 17 or situated in another place on the wheel 15. Moreover, a ferrite bridge 31 is provided between the at least one receiver coil 21 or the carrier material 30 with the at least one receiver coil 21 and the rim 16, coupling together the at least one receiver coil 21 and the rim 16. Thanks to such a ferrite bridge 31, a better magnetic coupling can be achieved. The carrier material 30, the ferrite bridge 21 and the rim 16 may be electrically and/or mechanically insulated or decoupled from each other. Now, if the wheel 15 rolls along an underground base providing a magnetic field, a current will be induced in the at least one receiver coil 21, by means of which rotor windings of the rotor 13 will be energized. In this way, a magnetic field is created, which magnetically couples the rotor 13 to the stator 14. Thanks to this magnetic coupling, the wheel 15 in turn experiences a torque or an accelerating force in the current direction of rolling of the wheel 15.

The at least one receiver coil 21 is wound such that the current induced during the rolling of the wheel along an underground base providing a magnetic field, especially a magnetic field varying over time, has at least one sinusoidally varying envelope. In order to accomplish this, it may optionally be provided that the winding direction of the receiver coil 21 or the receiver coils 21 experiences a reversal at least once in the circumferential direction R of the wheel 15. However, in this case, such a reversal of the winding direction is not absolutely required. Furthermore a current transformation suitable for the energizing of the rotor 13 is provided by a corresponding circuit G, described in more detail below, between the receiver coils 21 and the rotor 13. If the receiver coils 21 are situated in the tire 17, the cable feedthrough from the interior of the tire to the circuit G designated as reference 29 in FIG. 1 should be air-tight.

Although the configuration of the drive arrangement illustrated in FIG. 1 as a wheel hub motor 10 represents a preferred embodiment, the motor could also alternatively be mounted on the bodywork and be connected in a rotationally resistant manner to the wheel 15 by a cardan shaft. In this case, the phase lines should be led along the cardan shaft to the rotor 13 of this motor mounted on the bodywork. This is fundamentally possible, since both the rotor 13 and the cardan shaft as well as the phase lines are rotating at the same rotational speed.

Figure 2:
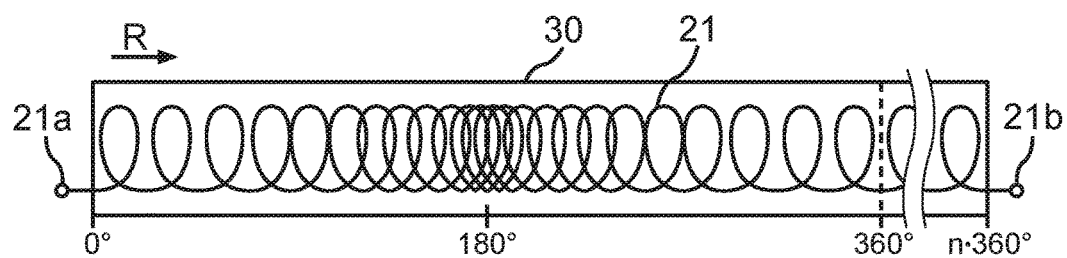
FIG. 2 a schematic representation of an unwound view of the carrier material with a receiver coil for a drive arrangement according to one exemplary embodiment of the invention.
Figure 3:
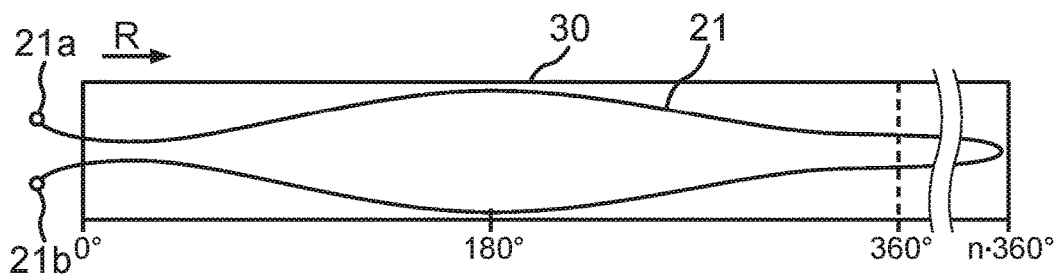
FIG. 3 a schematic representation of an unwound view of the carrier material with a receiver coil for a drive arrangement according to another exemplary embodiment of the invention.

Furthermore, different kinds of windings of the receiver coils 21 are conceivable, of which two shall now be discussed as examples, with the aid of FIG. 2 and FIG. 3.

FIG. 2 shows a schematic representation of an unwound view of the carrier material 30 with a receiver coil 21 according to an exemplary embodiment of the invention. In this representation, the number of degrees is plotted in a direction R corresponding to the angle of rotation of one wheel revolution relative to a given reference position of the wheel 15. The receiver coil 21 here has multiple windings, which extend in the circumferential direction R of the wheel 15. The areas enclosed by the respective windings vary sinusoidally in the R direction. Furthermore, a respective receiver coil 21 has a first terminal 21a as well as a second terminal 21b at its respective ends, between which the voltage induced in the receiver coil 21 can be picked off. The receiver coil 21 may be wrapped multiple times about the wheel 15, i.e., multiple cables extend along the indicated section.

An alternative winding option for the receiver coils 21 is shown in FIG. 3. FIG. 3 likewise shows a schematic representation of an unwound view of the carrier material 30 with a receiver coil 21 according to another exemplary embodiment of the invention. Here as well, the number of degrees is plotted in a direction R corresponding to the angle of rotation of the wheel 15 in the circumferential direction R. The laying of the cable of the receiver coil 21 runs sinusoidally in the wheel circumferential direction R. Also in this example, the receiver coil 21 in turn has a first terminal 21a as well as a second terminal 21b, between which the induced current or the induced voltage can be picked off. Also here the receiver coil 21 may be wrapped multiple times around the wheel 15, i.e., multiple cables extend along the indicated section.

The type of winding represented in FIG. 3 may thus be configured such that the amplitude of the induced current remains constant over the wheel rotation. For this, the top part and the bottom part of the cable winding of the receiver coil 21 shown in FIG. 3 are laid straight and not sinusoidally, as depicted. This induced current with constant amplitude may also be transformed by means of a suitable circuit G into the phase currents represented in FIG. 5 and FIG. 7. In this case, only one receiver coil 21 is needed, and the dividing into the three phases $I_G 1$ to $I_G 3$ occurs in the circuit G. The induced current can be transformed by the circuit G into a direct current and can then be converted by discrete semiconductor elements into phase currents.

Figure 4:
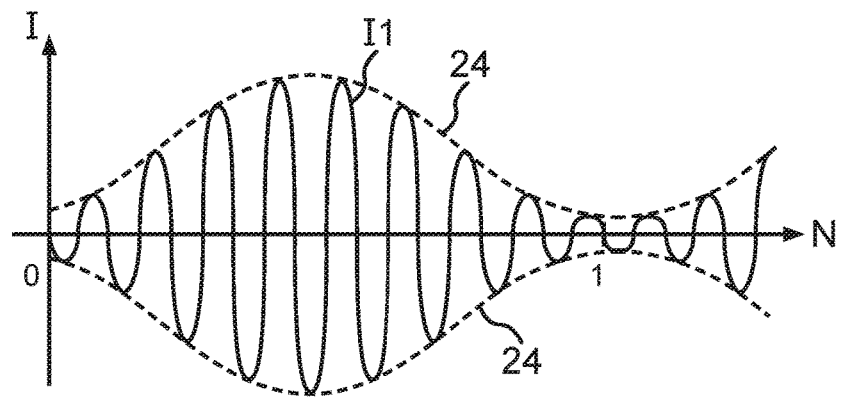
FIG. 4 a schematic representation of the curve of the current induced in a receiver coil during the rolling of the wheel of a drive arrangement according to one exemplary embodiment of the invention.
Figure 5:
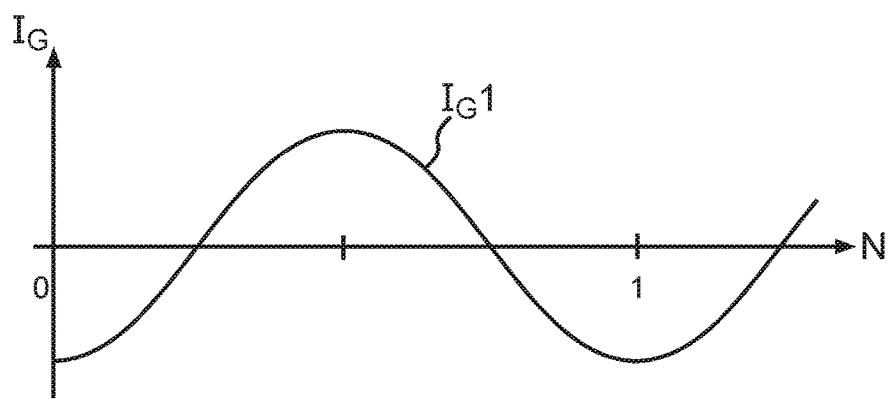
FIG. 5 a schematic representation of the curve of a current induced in a receiver coil and modified, especially smoothed, during the rolling of the wheel of a drive arrangement according to one exemplary embodiment of the invention.

Thanks to these winding variants shown in FIG. 2 and FIG. 3, as well as others not represented, a current induced in the receiver coil 21 during the rolling of the wheel 15 can now be provided, being shown schematically in FIG. 4. FIG. 4 shows a schematic representation of the current I1 induced during the rolling of the wheel 50 in a receiver coil 21 for one wheel revolution, N being the number of wheel revolutions. The current curve I1 here has a sinusoidally varying envelope 24. Optionally, this current curve I1 may be rectified, smoothed, or otherwise modified by a corresponding circuit G (see FIG. 1), which is arranged between the receiver coils 21 and the rotor 13. This circuit G may be configured as an electric or electronic circuit and may range in its embodiment from a perfectly simple rectifier bridge to an intelligent logic circuit, possibly with controller. Thanks to this circuit G, the induced power, especially the current and/or the voltage, can be changed, processed, and furthermore also measured in any predetermined manner and be supplied to the wheel hub motor 12. Thanks to such a circuit G, for example, the current I1 induced in a receiver coil 21 can be rectified and/or smoothed, as illustrated for example in FIG. 4, and provide an approximate current curve $I_G1$ as is shown schematically in FIG. 5, for example. FIG. 5 shows a schematic representation of the current curve $I_G1$ after being transformed by a rectifier G or generally by the circuit G, once again for one wheel revolution, where once again N denotes the number of wheel revolutions.

Figure 8:
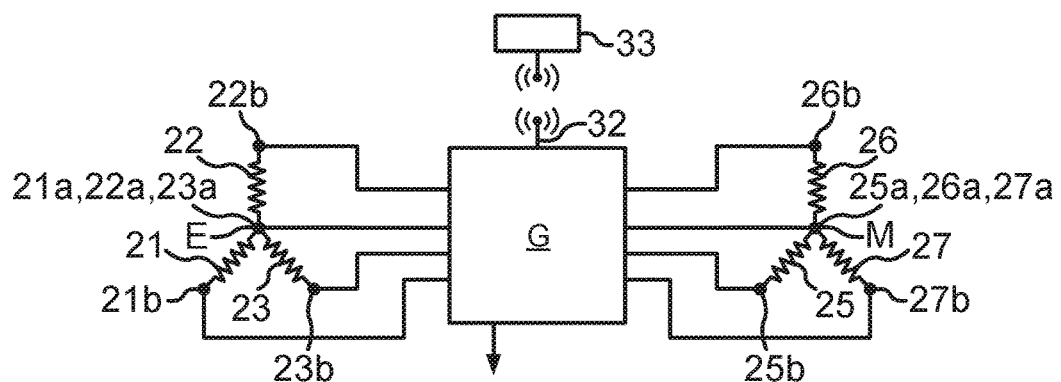
FIG. 8 a schematic representation of the interconnecting of the receiver coils with the rotor of the drive arrangement according to one exemplary embodiment of the invention.

Preferably, however, the wheel hub motor arrangement 10 has not just a single receiver coil, but instead multiple receiver coils, for example three coils 21, 22, 23 (see FIG. 8). Namely, in this way, a classical energizing of the wheel hub motor 12 can be provided advantageously with a three-phase alternating current. The configuration of these three receiver coils 21, 22, 23 may be as described for FIG. 2 and FIG. 3, but these multiple receiver coils 21, 22, 23 may be set off from each other relative to their arrangement in the circumferential direction R, for example by 120°. With reference to FIG. 2 and FIG. 3, this means, for example, that a second coil 22 is formed like the receiver coil 21 represented here, but it is set off relative to the receiver coil 21 represented here by 120° in the wheel circumferential direction from the receiver coil 21 shown, and furthermore a third receiver coil 23 is arranged, set off by 240° relative to the receiver coil 21 shown here.

Figure 6:
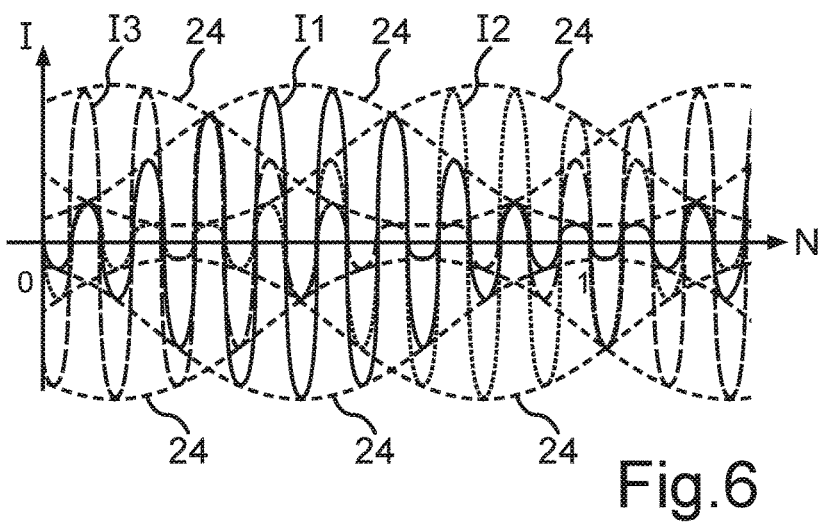
FIG. 6 a schematic representation of the curve of a current induced in three mutually offset receiver coils during the rolling of the wheel of a drive arrangement according to one exemplary embodiment of the invention.

Thanks to such an offset arrangement with 3 receiver coils 21, 22, 23, an induced current I1, I2, I3 can be provided during the rolling of the wheel 15 in the respective receiver coils 21, 22, 23, as shown schematically in FIG. 6. The current curve designated here as I1 corresponds to the current induced in a first receiver coil 21, the current curve designated by I2 corresponds to a current induced in a second receiver coil 22, set off by 120° from the first, and the third current curve designated by I3 corresponds to a current induced in a receiver coil 23 set off from the first coil 21 by 240°. These current curves I1, I2, I3 in turn each have a sinusoidally varying envelope 24. Furthermore, once again the current curves I1, I2, I3 are shown for one wheel revolution, and once again N denotes the number of wheel revolutions.

Figure 7:
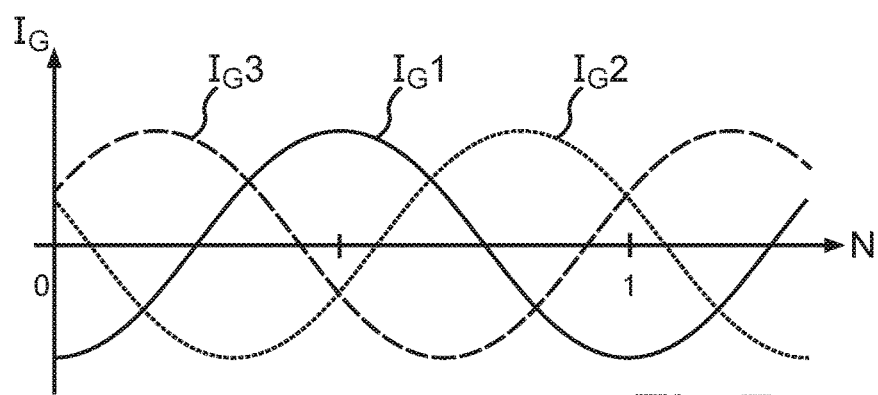
FIG. 7 a schematic representation of the curve of a current induced in three mutually offset receiver coils and modified, especially smoothed, during the rolling of the wheel of a drive arrangement according to one exemplary embodiment of the invention.

The respective current curves I1, I2, I3 here may also be smoothed or modified by the circuit G before being supplied to the wheel hub motor 12, so that once again a smoothed current curve results, for example, as is shown schematically in FIG. 7. FIG. 7 shows once again the current curve $I_G$ after smoothing or modification by the circuit G, in particular, once again a first current curve $I_G1$ corresponding to the first receiver coil 21, a second current curve $I_G2$ corresponding to the second receiver coil 22, and a third current curve $I_G3$ corresponding to the third receiver coil 23, especially once again for one wheel revolution, where N once again designates the number of wheel revolutions. Thus, by providing three mutually offset receiver coils 21, 22, 23, a three-phase alternating current can be provided. Furthermore, it is preferred that the ratio of the base frequency, which is based on the maximum rotational speed of the wheel times the number of receiver coils or the number of windings of the receiver coils 21, 22, 23, to the induction frequency of the magnetic field, which varies in time and is provided by the underground base, is as large as possible.

FIG. 8 shows a schematic representation of an example of an electrical wiring of the receiver coils 21, 22, 23 with the rotor 13 according to one exemplary embodiment of the invention. In this case the first terminals 21a, 22a, 23a of the respective receiver coils 21, 22, 23 are now hooked up together at a common star point E. The respective second terminals 21b, 22b, 23b of the respective receiver coils 21, 22, 23 are coupled by way of the optional circuit G to the rotor 13. The rotor 13 here also comprises multiple rotor windings, in this example three windings 25, 26, 27. But the rotor 13, for example, may also comprise a whole-number multiple of three rotor windings 25, 26, 27. In this case, these rotor windings 25, 26, 27 likewise have first terminals 25a, 26a, 27a, which are hooked up together at a common star point M. Furthermore, a respective winding of the rotor windings 25, 26, 27 also has a respective second terminal 25b, 26b, 27b, while a respective terminal of the second terminals 25b, 26b, 27b of the rotor 13 is interconnected with a respective terminal of the second terminals 21b, 22b, 23b of the respective receiver coils 21, 22, 23 by way of the circuit G. Optionally, the circuit G is also connected to one or more of the star points E and M.

Furthermore, besides the above described current, voltage, and/or frequency shaping, the circuit G may also provide a wireless interface 32 to the rest of the vehicle 33. By this interface 32, for example, data or control signals may be exchanged bidirectionally with the rest of the vehicle 33. Thus, for example, status data may be relayed from the wheel 15 to the rest of the vehicle 33, and, for example, a speed or a torque can also be controlled as a function of such data. Various measured quantities may also be detected by the circuit G and relayed to the rest of the vehicle 33. For example, the circuit G or optionally also a higher-level circuit may also provide a current measurement, voltage measurement, and/or current power measurement, or the like. Furthermore, the tire pressure and other physical measurement quantities may also be measured and transmitted, for example.

This makes possible many other additional configuration possibilities for the wheel hub motor arrangement 10. For example, the wheel hub motor arrangement 10 may also be used to maintain the driving lane of the vehicle. On the basis of the vehicle acceleration, especially in relation to the driving resistances, the power transmitted by induction can be concluded. This may serve as information as to whether the tire or tires 17 or the wheels 15 are still located entirely over the transmitter coils in the roadway. In order to detect such measured quantities, the wheel hub motor arrangement 10 may also have one or more corresponding detection means.

Likewise, a scaling element is optionally arranged in the circuit G, which can scale in amplitude the phase supplied to the motor, as shown for example in FIG. 7, and thus control the degree of the acceleration. Moreover, a measurement device may be present, which determines the wheel position, for example, by means of a sensor wheel 28 (see FIG. 1), and wherein electrical elements can be actuated as a function of this position.

Moreover, the wheel hub motor 12 may be configured, for example, as a synchronous motor or as an asynchronous or induction motor. If it is configured as a synchronous motor, the current I1, I2, I3 induced in the receiver coils 21, 22, 23 can be transmitted by means of various interconnections to the rotor coils 25, 26, 27. As already described, three receiver coils 21, 22, 23 with n times 3 rotor coils 25, 26, 27 can be wired up, for example, as shown in FIG. 8. Furthermore, in this case the stator 14 is configured with magnetic poles. The corresponding number of stator poles may be chosen almost at will, and, for example, one can in this way create wheel hub motors 12 with different numbers of poles on the stator and rotor side. The magnetic poles of the stator 14 could in theory be provided as permanent magnets, but they are preferably configured as electromagnets, because otherwise, in the event of a loss of the inductive energy transmission, the entire system may have eddy current losses and thus a braking effect. In order to provide an electromagnet or poles by means of an electromagnet, the stator 14 may furthermore have energizable stator coils. These may be energized with direct current, because only a static magnetic field needs to be generated. An energizing with alternating current is likewise possible. In addition to the shut-off upon loss of the inductive energy transmission, a control of the driving torque may also be achieved during operation, that is, with inductive energy transmission from an underground base to the coils 21, by a change in the current strength with which the stator coils are energized.

If the wheel hub motor 12 is configured, for example, as an induction motor, it is preferable for the rotor windings 25, 26, 27 to be energized with a frequency higher than the wheel rotational speed. This elevated frequency can be defined by the configuration of the circuitry between the at least one receiver coil 21, 22, 23 and the rotor coils 25, 26, 27 or rotor windings by way of the above described circuit G for changing at least one characteristic of the current induced in the at least one receiver coil 21, 22, 23, but in particular, by the configuration of the receiver coils 21, 22, 23, so that the induced current has a higher frequency envelope.

A vehicle with such a wheel hub motor arrangement 10 may also have one or more additional drive motors, which are connected to the wheel 15, for example, by means of a cardan shaft. These additional motors can accelerate the vehicle if an inductive energy supply is not possible. They may also be operated as a generator, while the vehicle is being accelerated via the wheel hub motor arrangement according to the invention or its embodiments. In this case, the traction battery of the vehicle is charged during travel.

Thus, on the whole, a drive arrangement, in particular, a wheel hub motor arrangement, is provided, which makes it possible to accelerate a vehicle having a wheel hub motor and corresponding receiver coils for inductive energy transmission independently from a charge state of the traction battery of the motor vehicle and without directly influencing the latter, as soon as the wheel is located above an energized transmitter coil, which is provided by way of the underground base. In this way, the energy transformation that occurs, in particular, without classical power electronics and battery is reduced to a minimum and thus the efficiency is significantly increased, while furthermore costly elements are also unnecessary. Thanks to the short inductive transmission distance between roadway and tires, the efficiency can be further boosted and the necessary strength of the magnetic field can be reduced. This reduced strength of the magnetic field provided by the underground base is healthier and may also allow longer transmitter coils in the roadway and thus less expense for synchronizing with the vehicles driving over it. This, in turn, enables an especially economical design of the transmitter coils in the underground base or in the roadway, since longer coil sections are possible.

The invention claimed is:

1. A drive arrangement with an inductively energizable drive motor, comprising:
   a wheel for a motor vehicle;
   a wheel carrier, on which the wheel is rotatably mountable;
   at least one receiver coil, which is arranged in the circumferential direction of the wheel;
   a stator of the drive motor;
   a rotor of the drive motor, arranged in a rotationally resistant manner on the wheel, having at least one rotor winding, which is electrically connected to the at least one receiver coil, wherein the rotor is magnetically coupled to the stator of the drive motor;
   wherein the drive arrangement is configured such that a current is induced by an underground base providing a magnetic field in the at least one receiver coil, by which the at least one rotor winding is energized to generate a magnetic field, so that the rotor and the stator are magnetically coupled.

2. The drive arrangement as claimed in claim 1, wherein the drive arrangement is designed such that, when the wheel rolls along on an underground base providing a magnetic field, a current is induced in the at least one receiver coil, by which the at least one rotor winding is energized to generate a magnetic field, so that the rotor and the stator are magnetically coupled in such a way that the wheel experiences an accelerating force due to the magnetic coupling between rotor and stator in the current direction of rotation of the wheel as it rolls along.

3. The drive arrangement as claimed in claim 1, wherein the stator of the drive motor is arranged in a rotationally resistant manner on the wheel carrier.

4. The drive arrangement as claimed in claim 1, wherein the at least one receiver coil is arranged on a carrier material in a tire of the wheel or it is vulcanized in the tire of the wheel or is arranged outside the tire of the wheel.

5. The drive arrangement as claimed in claim 1, wherein a ferrite bridge is arranged between the at least one receiver coil and a rim of the wheel.

6. The drive arrangement as claimed in claim 1, wherein the at least one receiver coil is arranged in the circumferential direction on the wheel in such a way that, when the wheel rolls along on an underground base providing a magnetic field, a current is induced in the at least one receiver coil, whose amplitude has a sinusoidal envelope in its course over time.

7. The drive arrangement as claimed in claim 1, wherein the at least one receiver coil is arranged in the circumferential direction on the wheel in such a way that, when the wheel rolls along on an underground base providing a magnetic field, a current is induced in the at least one receiver coil, whose amplitude has an envelope that has a time course differing from a sine shape, especially one that is constant over time.

8. The drive arrangement as claimed in claim 1, wherein the drive arrangement has multiple receiver coils with respective windings arranged in the circumferential direction of the wheel, wherein the windings of the respective receiver coils are offset from one another in the wheel circumferential direction, so that when the wheel rolls along on an underground base providing a magnetic field, a current is induced in the respective receiver coils, whose amplitude has a sinusoidal envelope in its time course, so that the respective envelopes are shifted by a predetermined phase from one another.

9. The drive arrangement as claimed in claim 1, wherein the rotor comprises at least three rotor windings and the drive arrangement comprises three receiver coils, which are arranged in a star circuit, so that first terminals of the respective receiver coils are electrically connected together at a first star point, and respective second terminals of the receiver coils are connected at least indirectly to respective second terminals of the at least three rotor windings, and respective first terminals of the at least three rotor windings are electrically connected together at a second star point.

10. The drive arrangement as claimed in claim 1, wherein the drive arrangement comprises a circuit by way of which the at least one receiver coil is connected to the at least one rotor winding, wherein the circuit is designed to alter at least one characteristic of a current induced in the at least one receiver coil, especially wherein the circuit comprises a switching device, by which the amplitude of the current induced in the at least one receiver coil is at least one of scalable and temporarily interruptible, and the circuit is designed to measure and transmit at least one wheel parameter, the at least one wheel parameter being at least one of a tire pressure and a tire temperature.

11. The drive arrangement as claimed in claim 1, wherein the drive motor:
   is designed as a synchronous motor, wherein the stator comprises at least one magnet, especially at least one electromagnet, for providing a magnetic field for the magnetic coupling with the rotor, wherein especially an acceleration of the wheel is controllable as a function of an energizing of the electromagnet; or
   is designed as an asynchronous or induction motor, wherein the stator is designed as a squirrel cage for the magnetic coupling with the rotor.

12. The drive arrangement as claimed in claim 1, wherein a transmission is arranged between the rotor and the wheel.

13. A wheel carrier arrangement having a wheel carrier, comprising:
   a stator for a drive motor, and wherein upon coupling of the wheel carrier arrangement with a rotor arrangement that has
      a wheel, which is rotatably mounted on the wheel carrier;
      at least one receiver coil, which is arranged in the circumferential direction of the wheel;
      a rotor arranged in a rotationally resistant manner on the wheel having at least one rotor winding, which is electrically connected to the at least one receiver coil;
   the wheel carrier arrangement is designed to exert an accelerating force on the wheel by a magnetic coupling of the stator and the rotor if, when the wheel rolls along on an underground base providing a magnetic field, a current is induced in the at least one receiver coil, by which the at least one rotor winding is energized to generate the magnetic coupling with the stator.

14. A motor vehicle having a drive arrangement as claimed in claim 1, wherein the motor vehicle furthermore comprises a drive mechanism different from the drive motor, which is designed to accelerate the motor vehicle independently of whether a magnetic field is provided by an underground base being driven over.

15. The motor vehicle as claimed in claim 14, wherein the motor vehicle is designed to determine, when driving over an underground base that provides a magnetic field in a specific driving region, whether the wheel is located in the specific driving region as a function of the current power available from the drive motor.

16. The drive arrangement as claimed in claim 1, wherein the drive arrangement comprises a circuit by way of which the at least one receiver coil is connected to the at least one rotor winding, wherein the circuit is designed to alter at least one characteristic of a current induced in the at least one receiver coil, especially wherein the circuit comprises a switching device, by which the amplitude of the current induced in the at least one receiver coil is at least one of scalable and temporarily interruptible, or the circuit is designed to measure and transmit at least one wheel parameter, the at least one wheel parameter being at least one of a tire pressure and a tire temperature.

* * * * *